Feb. 15, 1966     A. V. JOHNSON ETAL     3,234,634

RIVET REMOVING TOOL

Filed May 21, 1964

INVENTORS
ALBERT V. JOHNSON
JEROME Q. FLISRAM
HAROLD L. BRIDGMAN
BY
Merchant, Merchant & Gould
ATTORNEYS

United States Patent Office 3,234,634
Patented Feb. 15, 1966

3,234,634
RIVET REMOVING TOOL
Albert V. Johnson, Jerome Q. Flisram, and Harold L. Bridgman, Witten, S. Dak., assignors to Rivet-eze, Inc., Gregory, S. Dak., a corporation of South Dakota
Filed May 21, 1964, Ser. No. 369,085
3 Claims. (Cl. 29—200)

Our invention relates generally to hand tools, and more particularly to tools for setting and removing of rivets from sickle bars and the like.

Conventional sickle bars associated with sickle bar mowers, swathers, and the like comprise an elongated rigid bar mounted for reciprocation on the leading edge of said implements and having secured by rivets thereto in side-by-side abutting relationship, a plurality of forwardly projecting triangular cutter blades, one each for one of the stationary cooperating blade-carrying guard elements rigidly carried by said leading edge. Quite commonly, these cutter blades become bent, broken, or otherwise rendered inoperative so as to require replacement.

The primary object of our invention is the provision of a tool of the class above described with which it is possible to remove and replace damaged cutter blade sections in the field, and without the laborious and time-consuming task of disassembling the sickle and removal of the cutter bar therefrom.

A further object of our invention is the provision of a device of the class described which is compact in size so as to facilitate transporting, storing, and use thereof in restricted spaces.

A still further object of our invention is the provision of a device of the class above described which is relatively inexpensive to produce, is highly efficient in its operation, and is rugged and durable.

The above and still further objects of our invention will become apparent from the following detailed specification, appended claims, and attached drawings.

Referring to the drawings wherein like characters indicate like parts throughout the several views.

Figure 1:
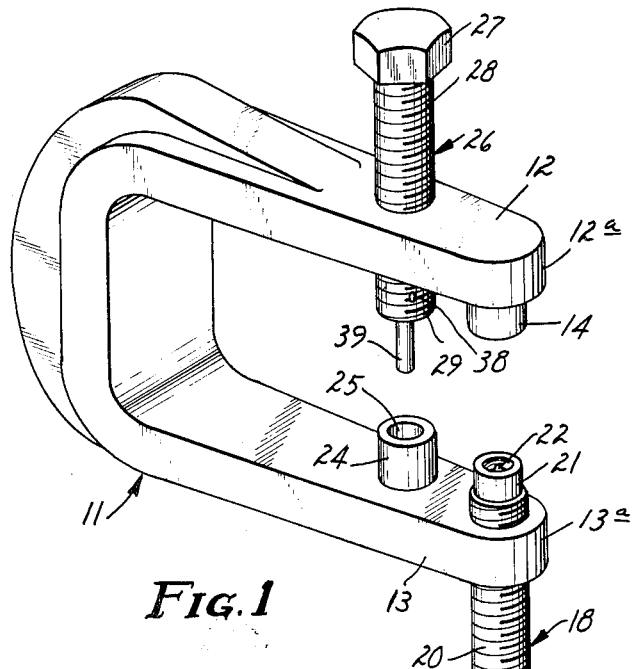
FIG. 1 is a view in perspective of our novel structure.
Figure 4:
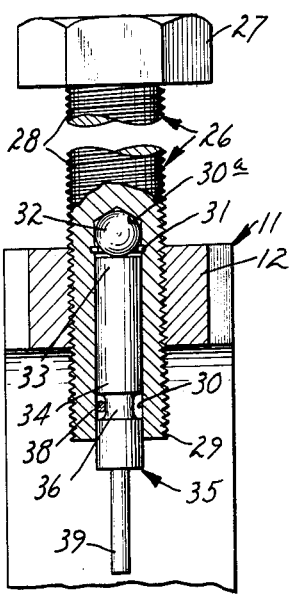
FIG. 4 is an enlarged view in axial section as seen from the line 4—4 of FIG. 3, some parts being broken away.

Referring with greater particularity to the drawings, the numeral 11 indicates in its entirety a U-shaped frame, the opposed generally parallel legs of which are identified by 12, 13. Carried by the projected end 12a of the leg 12 is an anvil 14 which, as shown particularly in FIG. 3, defines an inwardly opening socket 15 for the reception of the generally semi-spherical head 16 of a rivet 17. Carried by the projected end 13a of the leg 13 and having screw-threaded engagement therewith for coaxial movements toward and away from the anvil 14 is a ram 18. The head on the outer end of the ram 18 is identified by 19, the threads by 20, and the inner end thereof by 21. End 21 is formed to define an annular recess 22 for the peening of the shank end 23 of the rivet 17, as will be hereinafter described in greater detail.

Figure 3:
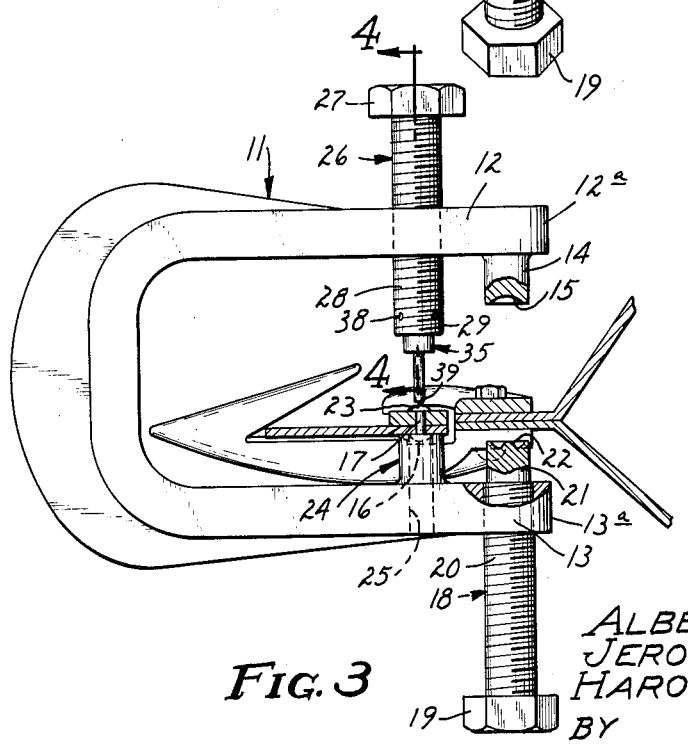
FIG. 3 is an enlarged view in section taken on the line 3—3 of FIG. 2.

Secured to the leg 13 in longitudinally offset relationship to the anvil 14 and the ram 18 associated therewith, is a second anvil 24 which, as shown particularly by the dotted lines of FIG. 3, is formed to define an axial passage 25 which extends therethrough and the leg 13 for reception of the head-equipped rivet 17.

Carried by the leg 12 and having screw-threaded engagement therewith for coaxial movements toward and away from the anvil 24 is a second ram 26, the outer head of which bears the numeral 27, the threads 28, and the inner end the numeral 29. As shown, the inner end 29 of the ram 26 is formed to define an inwardly opening blind bore 30. Seated in the blind end 30a of the bore 30, and retained therein by annular lock ring 31, is a thrust ball 32. Snugly but rotatively received within the bore 30, with its extreme end 33 in engagement with the thrust ball 32, is the diametrically enlarged outer end portion 34 of a punch element 35. Portion 34, as shown, is formed within the bore 30 to define an annular groove 36 for the reception of a retaining pin 38. The inwardly projecting diametrically reduced rivet-engaging end of the punch element 35 is identified by the numeral 39.

Figure 2:
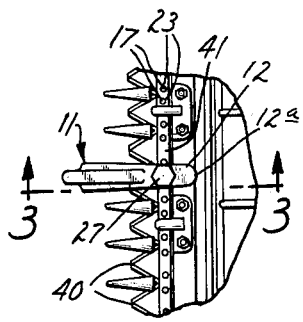
FIG. 2 is a view in top plan of a conventional sickle bar showing our novel device in use thereon.

With our novel tool above described, it is but necessary to replace a broken or damaged cutter blade 40 by inserting the cutter bar 41 between the legs 12, 13, as shown in FIGS. 2 and 3, with the head 16 of the rivet 17 received within the inner end of the passage 25 defined by the anvil 24. By applying a suitable wrench or other tool to the head 27 of the ram 26, the diametrically reduced inner end 39 of the punch element 35 is brought to bear upon the shank end 23 of the rivet 17 with sufficient force to push same through the passage 25. After each of the rivets 17 securing any one of the blades 40 to the bar 41 have been removed in this manner, the frame 11 is removed from the bar 41 and the damaged blade 40 removed and replaced with a new blade 40. To rivet the new blade in position on the bar 41, the frame 11 is inverted and the bar 41 is again placed between the legs 12, 13 with the head 16 of the rivet 17 positioned within the socket 15 of anvil 14. Finally, by imparting rotary movements to the ram 18 whereby to cause engagement with the inner end 22 thereof with the shank end 23 of the rivet 17, a peening action will be imparted to said shank end 23 upon the application of sufficient force, such as through a wrench being applied to the head 19. It might here be mentioned that rotary movement of the ram 26, after engagement of the projected end 39 of the punch element 35 with the shank end 23 of the rivet 17, does not impart movements to the punch element 35, thereby avoiding damage to the diametrically reduced inner end 39.

Our invention has been thoroughly tested and found to be completely satisfactory for the accomplishment of the above objects; and while we have disclosed a preferred embodiment thereof, same may well be capable of modification without departure from the scope and spirit of the appended claims.

What is claimed is:
1. In a device of the class described,
   (a) a U-shaped frame having opposed generally parallel legs,
   (b) a first anvil carried by the projected end of one of said legs and defining a rivet-head-receiving socket,
   (c) a second anvil carried by the other of said legs and defining therethrough an axial passage for a rivet,
   (d) the projected axes of said anvils being offset longitudinally of said legs and each thereof bisecting the axis of the opposed leg,
   (e) a pair of screw-thread-equipped rams one each having screw-threaded engagement with a different one of said legs in coaxial alignment with the anvil carried by the other of said legs,
   (f) the ram in alignment with said first anvil defining a rivet-peening socket,
   (g) the ram in alignment with said second anvil defining a diametrically reduced punch element receivable in said axial passage.

2. The structure defined in claim 1 in which said punch element is mounted coaxially for independent rotary movements with respect to its associated ram.

3. The structure defined in claim 2 in which
(a) said ram in alignment with said second anvil being formed to define an axially inwardly opening blind bore for the rotary reception of said punch element,
(b) and in further combination with an axial thrust ball in the blind end of said bore in engagement with the inner end of said punch element,
(c) and removable means limiting axial movements of said punch element in said bore.

References Cited by the Examiner

UNITED STATES PATENTS

| 626,802 | 6/1899 | Zamboni | 78—46 |
| 1,130,121 | 3/1915 | Thrasher | 78—46 |
| 3,138,977 | 6/1964 | Aitken | 78—6 |

FOREIGN PATENTS

| 482,744 | 7/1953 | Italy. |

CHARLES W. LANHAM, *Primary Examiner.*
WILLIAM J. STEPHENSON, *Examiner.*
G. P. CROSBY, *Assistant Examiner.*